United States Patent
Peace (10) Patent No.: US 10,480,374 B2
(45) Date of Patent: Nov. 19, 2019

(54) DOSING MODULE

(71) Applicant: J.C. BAMFORD EXCAVATORS LIMITED, Uttoxeter (GB)

(72) Inventor: Nathan James Peace, Uttoxeter (GB)

(73) Assignee: J.C. BAMFORD EXCAVATORS LIMITED, Uttoxeter, Staffordshire (GB)

( * ) Notice: Subject to any disclaimer, the term of this patent is extended or adjusted under 35 U.S.C. 154(b) by 158 days.

(21) Appl. No.: 15/387,051

(22) Filed: Dec. 21, 2016

(65) Prior Publication Data

US 2017/0175606 A1    Jun. 22, 2017

(30) Foreign Application Priority Data

Dec. 21, 2015 (GB) .................................. 1522547.7

(51) Int. Cl.
*F01N 3/20* (2006.01)
*F01N 11/00* (2006.01)
*E02F 9/08* (2006.01)

(52) U.S. Cl.
CPC ............ *F01N 3/208* (2013.01); *E02F 9/0866* (2013.01); *F01N 3/2066* (2013.01); *F01N 11/00* (2013.01);
(Continued)

(58) Field of Classification Search
CPC ... F01N 3/208; E02F 9/0866; F02N 2610/146
See application file for complete search history.

(56) References Cited

U.S. PATENT DOCUMENTS

2007/0080239 A1* 4/2007 Yasukawa .......... F02M 51/0682
239/135
2007/0092413 A1* 4/2007 Hirata ..................... F01N 3/208
422/177
(Continued)

FOREIGN PATENT DOCUMENTS

WO    WO-2009/020541 A1    2/2009
WO    WO-2016/063697 A1    4/2016

OTHER PUBLICATIONS

Search Report for GB Application No. 1522547.7, dated Jun. 29, 2016.
(Continued)

*Primary Examiner* — Patrick D Maines
(74) *Attorney, Agent, or Firm* — Marshall, Gerstein & Borun LLP (57) ABSTRACT

A dosing module for an emissions abatement system, the dosing module including an armature, means for moving the armature and a valve body having an outlet; the dosing module having an unblocked condition, in which the armature is moveable between a first position, in which the outlet is closed by the armature, and a second position, in which the armature is spaced apart from the outlet, and wherein, in use, application of electricity to the means for moving the armature at a first level of energy causes the armature to move from the first position to the second position; the dosing module further having a blocked condition, in which flow of a liquid through the outlet is prevented, wherein, in use, application of electricity to the means for moving the armature at a second level of energy causes the dosing module to change to the unblocked condition.

6 Claims, 5 Drawing Sheets

(52) U.S. Cl.
CPC .... *F01N 2610/02* (2013.01); *F01N 2610/146* (2013.01); *F01N 2610/1453* (2013.01); *F01N 2610/1486* (2013.01); *F01N 2900/0416* (2013.01); *F01N 2900/1808* (2013.01); *F01N 2900/1811* (2013.01); *F01N 2900/1812* (2013.01); *F01N 2900/1821* (2013.01); *Y02A 50/2325* (2018.01); *Y02T 10/24* (2013.01); *Y02T 10/47* (2013.01)

(56) References Cited

U.S. PATENT DOCUMENTS

| | | | |
|---|---|---|---|
| 2008/0236147 A1 | 10/2008 | Van Vuuren et al. | |
| 2009/0038299 A1* | 2/2009 | Gierszewski | F01N 3/2066 60/301 |
| 2009/0077949 A1 | 3/2009 | Kleinknecht | |
| 2012/0090296 A1* | 4/2012 | Yacoub | F01N 3/208 60/274 |
| 2012/0181261 A1 | 7/2012 | Bruck et al. | |
| 2013/0269321 A1 | 10/2013 | Watanabe et al. | |
| 2015/0089926 A1* | 4/2015 | Ikeda | F01N 3/2046 60/277 |
| 2016/0017782 A1* | 1/2016 | Maguin | F01N 3/2066 60/274 |

OTHER PUBLICATIONS

Office Action issued in European Patent Application No. 16 202 861.7, dated Apr. 3, 2018.
Extended European Search Report for EP 16 20 2861, dated Jul. 21, 2017.

\* cited by examiner

DOSING MODULE

FIELD OF THE INVENTION

Technical Field

The present invention relates to a dosing module. More particularly, the present invention relates to a dosing module for use in an emission abatement system. The present invention also relates to a method of operating a dosing module.

BACKGROUND OF THE INVENTION

In order to reduce atmospheric pollution caused by the emission of potentially harmful substances from engines, legislation has been introduced in the United States of America (USA) and the European Union (EU) to progressively lower legally binding limits for certain emissions, including oxides of nitrogen (NOx).

Under US legislation, known as the "Tier 4 Final" standard, and the EU Stage IV legislation, emissions of NOx are limited to 0.40 g/kWh for engines with power outputs in the range of 56 to 560 kW.

Various emission abatements technologies are known for reducing the output of NOx from diesel engines, including exhaust gas recirculation (EGR) systems, which inhibit NOx production by lowering the combustion temperature, lean NOx traps (LNT) or NOx adsorber catalysts (NAC) which act to 'hold' NOx, and selective catalytic reduction (SCR) which converts NO and NO2 to nitrogen and water.

SCR combines the use of a catalyst such as vanadium, tungsten, copper zeolite (Cu-Zeolite) or iron zeolite (Fe-Zeolite) with a reductant such as anhydrous ammonia, aqueous ammonia or, more typically, urea, to convert NO and NO2 into nitrogen and water. Urea is typically used as the reductant, but has to be injected into the exhaust upstream of the SCR catalyst in order to thermally decompose into ammonia by the point at which it enters the SCR catalyst. Urea is preferred over ammonia, as it is substantially safer to store and transport. In the USA, commercially available urea for use with SCRs is referred to as Diesel Exhaust Fluid (DEF), whereas in Europe it is referred to as AdBlue®. For SCRs to function effectively at the lower end of the temperature spectrum it has hitherto been desirable for there to be a 50:50 split of NO and NO2, although Cu-Zeolite catalysts have been found to improve performance at temperatures of less than 300° C. when there is little NO2 available. An advantage of SCR is that is has minimal impact on specific fuel consumption. Disadvantages include the need to additionally replenish the reductant on a periodic basis and to provide space on a vehicle to package a reservoir of reductant. Typically, reductant usage is 1-7% that of diesel consumption.

The urea solution is injected into the exhaust passage using a dosing module, also known as a DEF or AdBlue® injector or a dosing valve. The formation of crystals of urea within a dosing module adversely affects the supply of urea to the exhaust passage, for example the formation of urea crystals at the dosing module tip (orifice crystallization) may prevent the injection of urea out of the dosing module and the formation of urea crystals within the body of the dosing module (in-valve crystallization) may prevent movement of the valve and thus prevent the supply of urea.

A known method for unblocking dosing modules is to increase the temperature of the dosing module and melt the urea crystals using exhaust gases. This requires the temperature of the dosing module to be heated to over 100° C. This is difficult to achieve since only the tip of the dosing module is located close to the exhaust gases and the body of the dosing module is surrounded by a coolant jacket. Furthermore, on a low level duty cycle, the exhaust gas temperature is not high enough raise the temperature of the dosing module to a level sufficient to melt urea crystals.

SUMMARY OF THE INVENTION

Systems have been developed that increase the temperature of the exhaust gas in order to heat the dosing module sufficiently to melt the urea crystals; however these systems also suffer the aforementioned disadvantages, namely that only the tip of the dosing module is exposed to the exhaust gases and the cooling jacket that is present around the dosing module makes the transfer of heat at a temperature high enough to melt urea crystals from the dosing module tip to the dosing module body difficult.

According to a first aspect of the invention there is provided a dosing module for an emissions abatement system, the dosing module including an armature, means for moving the armature and a valve body having an outlet; the dosing module having an unblocked condition, in which the armature is moveable between a first position, in which the outlet is closed by the armature, and a second position, in which the armature is spaced apart from the outlet, and wherein, in use, application of electricity to the means for moving the armature at a first level of energy causes the armature to move from the first position to the second position; the dosing module further having a blocked condition, in which flow of a liquid through the outlet is prevented, wherein, in use, application of electricity to the means for moving the armature at a second level of energy causes the dosing module to change to the unblocked condition.

When the dosing module is in the blocked condition, movement of the armature may be prevented.

The second level of energy may be greater than the first level of energy.

The first level of energy may be defined by a first power, preferably a first electrical current and/or the second level of energy may be defined by a second power, preferably a second electrical current.

The second electrical current may be at least 400 milliamps, preferably at least 500 milliamps.

The dosing module may have a first temperature and application of electricity to the means for moving the armature at the second level of energy may cause the temperature of the dosing module to be increased to a second temperature.

The second temperature may be at least 100° C.

The dosing module may further include a spring to bias the armature towards the outlet in the first position. The means for moving the armature may be a coil device. The coil device may include a coil.

Application of electricity to the coil at the first level of energy may cause the armature to move from the first position to the second position.

Application of electricity to the coil at the second level of energy may cause the dosing module to change to the unblocked condition.

The coil may be a first coil and the coil device may further include a second coil.

Application of electricity to the first coil at the first level of energy may cause the armature to move from the first position to the second position and/or application of electricity to the second coil at the second level of energy may cause the dosing module to change to the unblocked condition.

When the armature is in the second position, a liquid may flow through the outlet. The liquid may include a reductant. The liquid may include urea. The liquid may include Diesel Exhaust Fluid or AdBlue®.

When the dosing module is in the blocked condition, flow of a liquid through the outlet may be prevented by crystals of the liquid.

The dosing module may further include a coolant, for example a cooling jacket or cooling fins.

The dosing module may be an engine after-treatment dosing module.

According to a second aspect of the invention there is provided a vehicle including an engine and an exhaust system, the exhaust system including an emissions abatement system having a dosing module according to the first aspect of the invention. The vehicle may be a working machine, for example a loadall or a backhoe or a loading shovel or an excavator.

According to a third aspect of the invention there is provided a method of operating a dosing module for an emissions abatement system, the method including the steps:

(a) determining that the dosing module is in a blocked condition;

(b) increasing the temperature of the dosing module by applying electricity to the dosing module; and (c) heating the dosing module until the dosing module is in an unblocked condition, in which liquid can flow through the dosing module.

The method may further include the step:

(d) operating the dosing module to pass liquid through the dosing module.

The step of determining that the dosing module is in a blocked condition may include determining that flow of a liquid through the dosing module is prevented.

The step of determining that the dosing module is in a blocked condition may include:

(i) determining a first pressure of a liquid to be supplied by the dosing module prior to actuation of the dosing module;

(ii) determining a second pressure of a liquid to be supplied by the dosing module during actuation of the dosing module; and (iii) comparing the first pressure and the second pressure.

The second pressure may be greater than the first pressure.

The step of increasing the temperature of the dosing module by applying electricity to the dosing module may include increasing the temperature to at least 100° C.

The step of increasing the temperature of the dosing module by applying electricity to the dosing module may include holding the increased temperature for less than 400 seconds, preferably less than 200 seconds.

The step of increasing the temperature of the dosing module by applying electricity to the dosing module may include applying an electrical current to the dosing module. The electrical current may be at least 400 milliamps, preferably at least 500 milliamps.

The liquid may include a reductant. The liquid may include urea. The liquid may include Diesel Exhaust Fluid or AdBlue®.

When the dosing module is in the blocked condition, flow of a liquid through the outlet may be prevented by crystals of the liquid.

BRIEF DESCRIPTION OF THE DRAWINGS

Embodiments of the invention will now be described with reference to the accompanying drawings in which.

DETAILED DESCRIPTION

Figure 1:
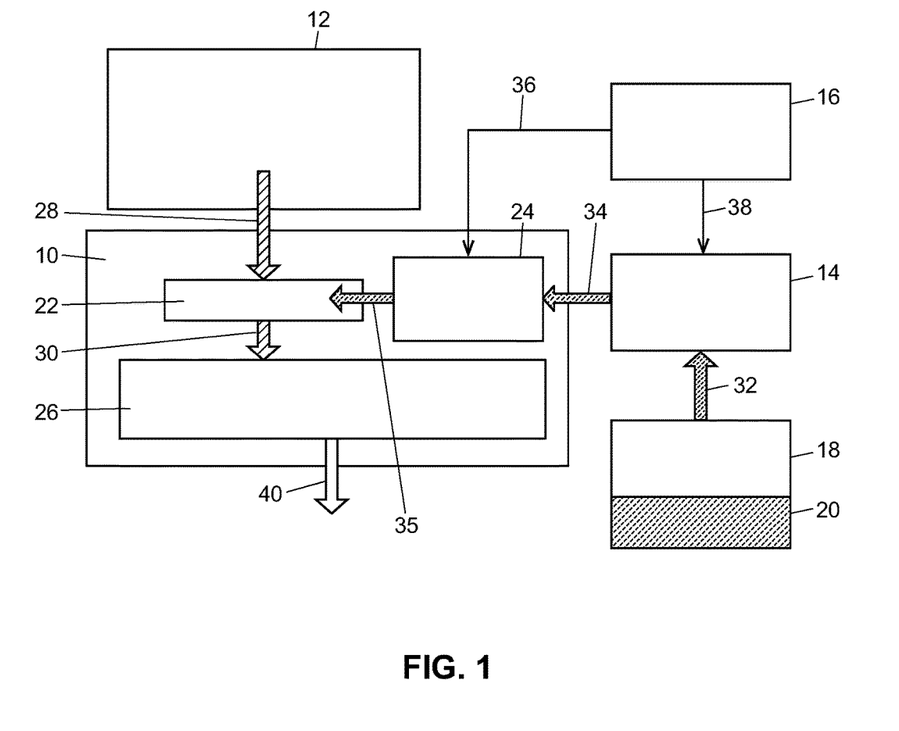
FIG. 1 is a schematic representation of an exhaust system for a working machine.

Referring now to FIG. 1 there is shown an exhaust system 10. The exhaust system 10 is connected to an internal combustion engine 12, a supply module 14 and a dosing control unit 16. The supply module 14 is connected to a tank 18, which has a solution of urea 20 contained within it.

The exhaust system 10 includes an exhaust mixer 22, a dosing module 24 and a selective catalytic reducer 26.

The internal combustion engine 12 is connected to the exhaust mixer 22 by passageway 28 and the exhaust mixer 22 is connected to the selective catalytic reducer 26 by passageway 30. In this way, exhaust gas can pass from the internal combustion engine 12 to the selective catalytic reducer 26.

The tank 18 is connected to the supply module 14 by passageway 32 and the supply module is connected to the dosing module by passageway 34. In this way, urea solution 20 can pass from the urea tank 18 through the supply module 14 to the dosing module 24.

The dosing module 24 is connected to the exhaust mixer 22 by the passageway 35. In this way, urea solution 20 can be transferred from the dosing module 24 to the exhaust mixer 22 when required.

The dosing control unit 16 is connected to the dosing module 24 by connection 36 and the dosing control unit 16 is connected to the supply module 14 by connection 38. In this way, the dosing control unit 16 is able to detect the condition of the dosing module 24 and ensure that urea solution 20 is supplied to the dosing module by the supply module 14 and/or to the exhaust mixer 22 by the dosing module 24 when required.

The exhaust system 10 further includes an exhaust 40 by which treated exhaust gas is released to the atmosphere.

The dosing module 24 will now be described with particular reference to FIGS. 2 and 3.

The dosing module 24 includes a housing or body 42, an injector 44, armature 46, a spring 48, a solenoid coil 50 and a coolant jacket 54.

The housing or body 42 includes an electrical connector 52 and a central passageway 60 having a first end or inlet 62 and a second end 64.

The injector 44 is a generally cylindrical, hollow body having a central bore 66. The injector 44 has a first end 69 and a second end or outlet 71.

The armature 46 is a generally cylindrical body having a first end 68 and a second end 70. The armature 46 has a T-shaped portion 72 adjacent to the first end 68. The T-shaped portion 72 has a shoulder 73. The armature 46 includes a flared portion 74 at the second end 70.

The spring 48 has a first end 76 and a second end 78.

The coolant jacket 54 includes an inlet 56 and a coolant channel 58 by which coolant is supplied to and is circulated around the housing 42.

The dosing module 24 is constructed as follows.

The solenoid coil 50 is inserted in the second end 64 of the housing 42. The injector 44 is inserted in the central passageway 60 of the housing 42 such that the central bore 66 of the injector 44 extends the length of the dosing module 24 from the first end 62 of the housing 42 to the outlet 71 of the injector 44.

The first end 76 of the spring 48 is mounted to the shoulder 73 of the T-shaped portion 72 of the armature 46 and the second end 78 of the spring 48 is mounted adjacent to the second end 64 of the housing 42.

Figure 2:
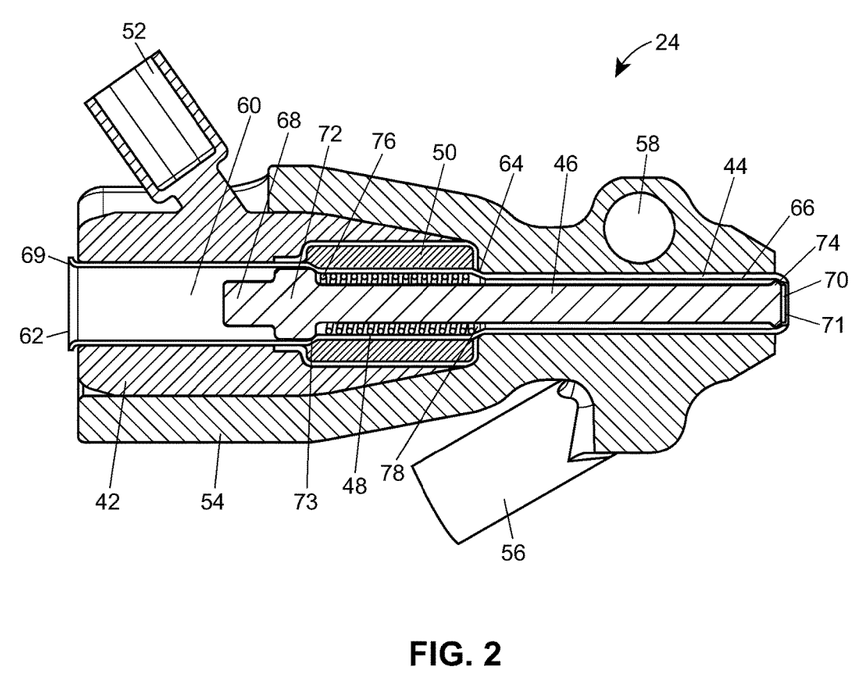
FIG. 2 is a cross section view of a dosing module according to a first embodiment in the closed position.

The armature 46 and spring 48 are mounted in the central bore 66 of the injector 44 such that the spring 48 biases the second end 70 of the armature towards the outlet 71 of the injector 44 (as shown in FIG. 2). The outlet 71 of the injector 44 is closed by the flared portion 74 of the armature 46.

The first end 62 of the housing 42 is connected to the supply module 14 by passageway 34 and the outlet 71 of the injector 44 is connected to the exhaust mixer 22 by the passageway 35.

With the dosing module 24 in the configuration shown in FIG. 2, urea solution 20 cannot pass from the inlet 62 of the housing 42 to the outlet 71 of the injector 44 and thus urea solution 20 is not supplied to the exhaust mixer 22.

Operation of the dosing module 24 to supply urea solution 20 to the exhaust mixer 22 will now be described.

As shown in FIG. 2, the outlet 71 of the injector 44 is closed by the flared end 74 of the armature 46.

The supply of electricity via the electrical connector 52 to the dosing module 24 causes the solenoid coil 50 to be charged and the armature 46 to move towards the first end 62 of the housing 42 against the bias of the spring 48. This results in the flared end 74 of the armature 46 moving away from the outlet 71 of the injector 44 and the dosing module to be in the open position (as shown in FIG. 3).

Figure 3:
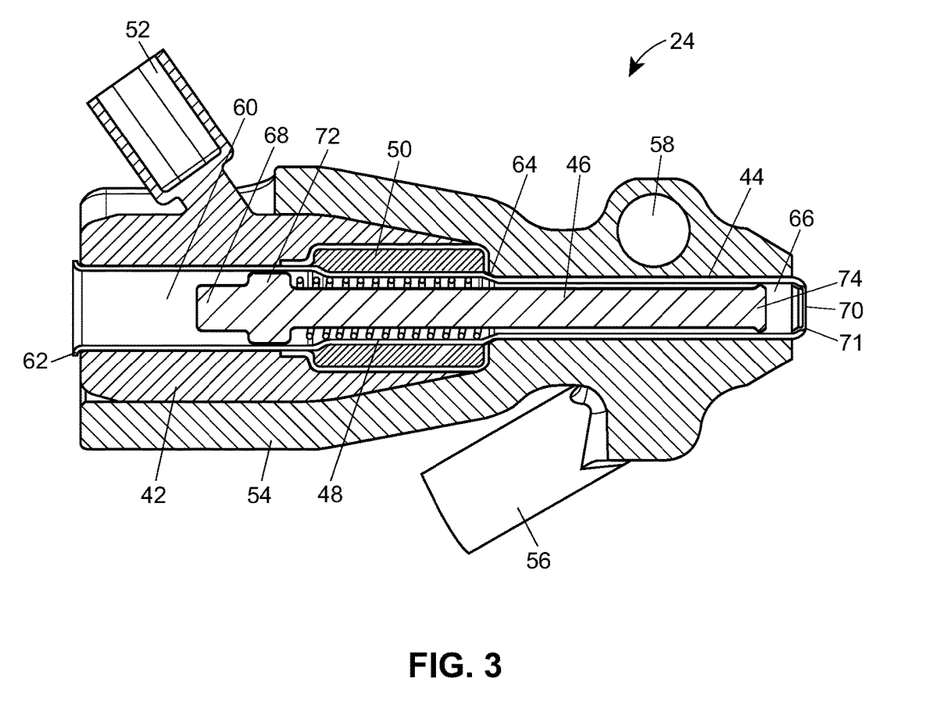
FIG. 3 is a cross section view of the dosing module of FIG. 2 in the open position.

With the dosing module 24 in the position shown in FIG. 3, urea solution 20 is able to flow from the first end 62 of the housing 42 to the outlet 71 of the injector 44 and thus urea solution 20 can be supplied to the exhaust mixer 22.

As described above, the formation of crystals of urea within known dosing module adversely affects the supply of urea to the exhaust mixer, for example by blocking the passage through which the urea solution passes when the dosing module is activated and/or by preventing movement of the armature within the dosing module.

Figure 4:
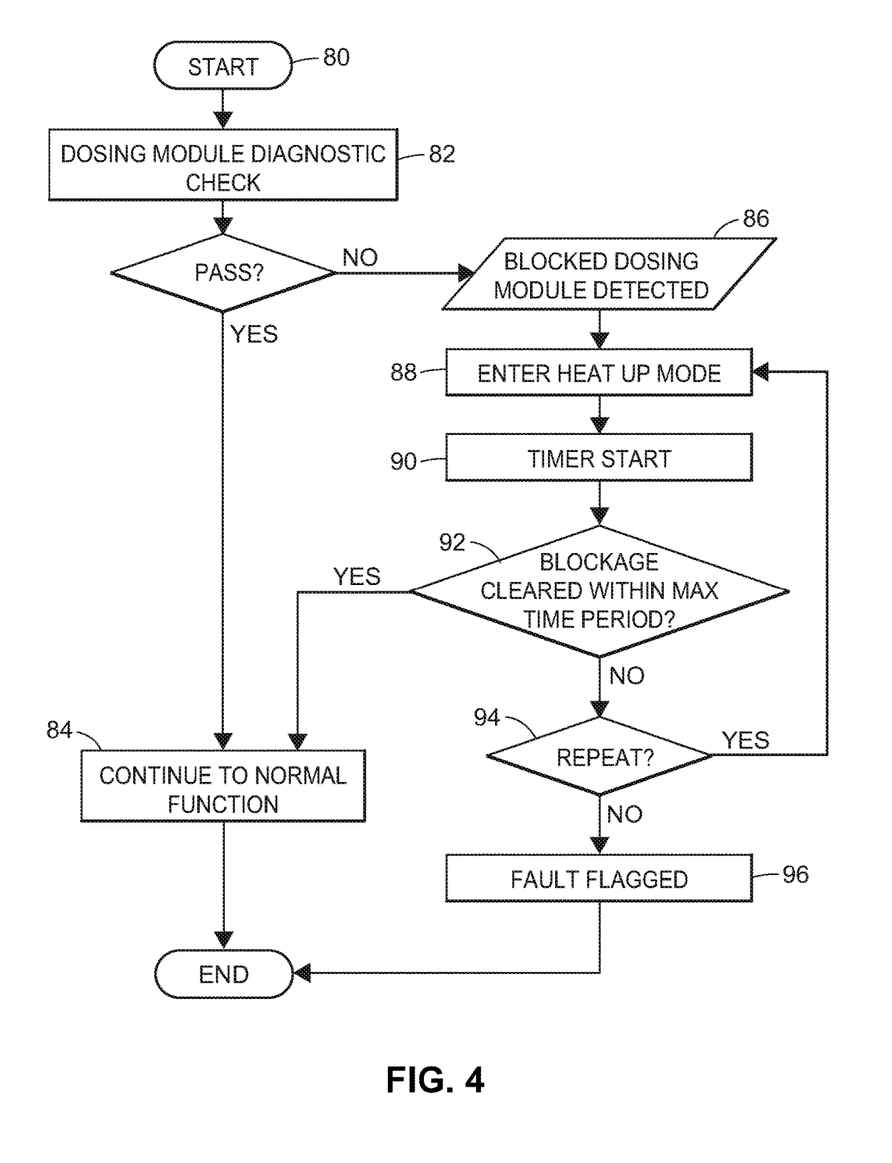
FIG. 4 is a flow diagram showing operation of a dosing module according to the present invention.

Operation of the dosing module 24 of the present invention will now be described with particular reference to FIG. 4.

When the engine (not shown) of a working machine (not shown) on which the dosing module 24 is installed is started 80, the dosing module control unit 16 runs a dosing module diagnostic check 82 to determine if urea solution 20 is able to pass through the dosing module 24 to the exhaust mixer 22, for example by determining the pressure of urea solution 20 at the inlet 62 of the housing 42 and comparing the determined pressure with the pre-determined pressure of urea solution 20 at the inlet 62 of the housing 42 when the dosing module 24 is in each of the configurations shown in FIGS. 2 and 3 (i.e. in the open and closed positions).

In the event that the dosing module 24 passes the dosing module diagnostic check 82, normal operation continues 84 as described above.

In the event that the dosing module 24 does not pass the dosing module diagnostic check 82, the dosing module 24 is detected to be blocked 86. The detection of a blocked dosing module 86 causes the dosing module control unit 16 to trigger heat up mode 88. With the dosing module 24 in heat up mode 88, electricity is supplied to the solenoid coil 50 at a greater power than is used to operate the dosing module under normal conditions, for example use of a current of at least 400 milliamps. This causes the temperature of the dosing module 24 to be increased, for example to 100° C. The temperature is held for a period of time 90, for example 360 seconds.

The dosing module control unit 16 undertakes a diagnostic check 92 to determine if the crystals of urea have melted and therefore if the dosing module 24 is unblocked.

In the event that the dosing module 24 is determined to be unblocked, normal operation continues 84 as described above.

In the event that the dosing module 24 is determined to still be blocked, the dosing module control unit 16 repeats heat up mode 88. As described above, with the dosing module 24 in heat up mode 88, electricity is supplied to the solenoid coil 50 at a greater power than is used to operate the dosing module under normal conditions, for example use of a current of at least 400 milliamps. This causes the temperature of the dosing module 24 to be increased, for example to 100° C. The temperature is held for a period of time 90, for example 360 seconds.

The dosing module control unit 16 undertakes a diagnostic check 92 to determine if the crystals of urea have melted and therefore if the dosing module 24 is unblocked.

In the event that the dosing module 24 is determined to be unblocked, normal operation continues 84 as described above.

In the event that the dosing module 24 is determined to still be blocked, the dosing module control unit 16 triggers an alert that there is a fault 96 with the dosing module 24.

The present invention advantageously enables the dosing module 24 to be heated to a temperature that enables urea crystals within the dosing module 24 to be melted even in the presence of a cooling jacket 54 around the outside of the dosing module 24.

Figure 5:
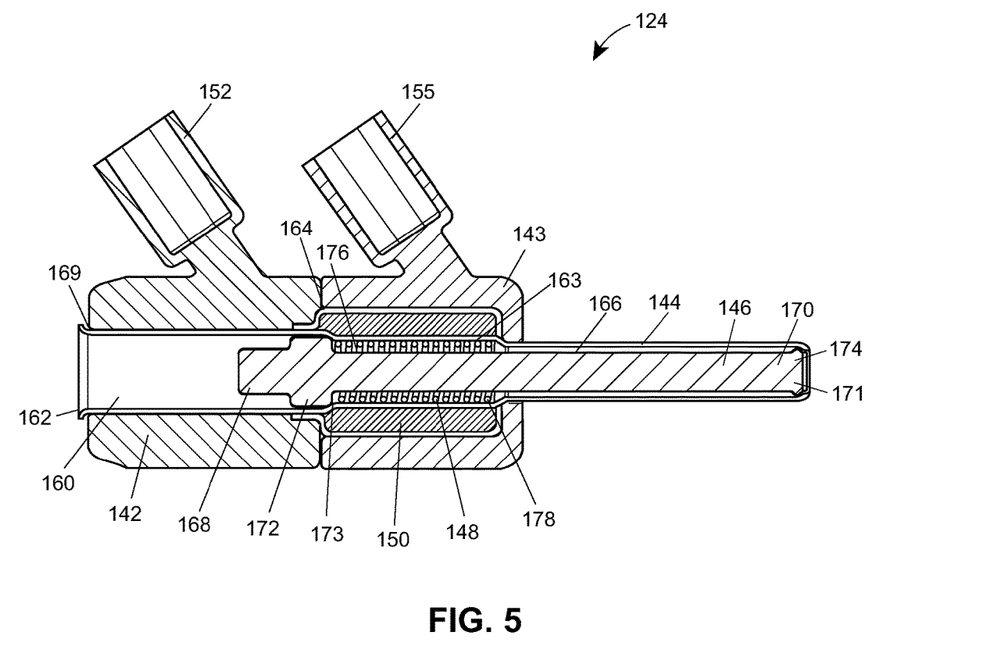
FIG. 5 is a cross section view of a dosing module according to an alternative embodiment in the closed position.

Referring now to FIG. 5 there is shown a dosing module 124 according to a second embodiment of the present invention.

The dosing module 124 includes a first housing or body 142, an injector 144, an armature 146, a spring 148, a first solenoid coil 150 and a second housing 143 in which a second solenoid coil (not shown) is housed.

The first housing 142 includes a first electrical connector 152 and a central passageway 160 having a first end or inlet 162 and a second end 164.

The injector 144 is a generally cylindrical, hollow body having a central bore 166. The injector 144 has a first end 169 and a second end or outlet 171.

The armature 146 is a generally cylindrical body having a first end 168 and a second end 170. The armature 146 has a T-shaped portion 172 adjacent to the first end 168. The T-shaped portion 172 has a shoulder 173. The armature 146 includes a flared portion 174 at the second end 170.

The spring 148 has a first end 176 and a second end 178.

The second housing 143 includes a second electrical connector 155 and a central passageway 163.

The dosing module 124 is constructed as follows.

The solenoid coil 150 is inserted in the central passageway 163 of the second housing 143. The injector 144 is inserted in the central passageway 160 of the housing 142 and the central passageway 163 of the second housing 143 such that the central bore 166 of the injector 144 extends the length of the dosing module 124 from the first end 162 of the first housing 142 to the outlet 171 of the injector 144.

The first end 176 of the spring 148 is mounted to the shoulder 173 of the T-shaped portion 172 of the armature 146 and the second end 178 of the spring 148 is mounted adjacent to opening 167 in the second housing 143.

The armature 146 and spring 148 are mounted in the central bore 166 of the injector 144 such that the spring 148 biases the second end 170 of the armature 146 towards the outlet 171 of the injector 144 (as shown in FIG. 5). The outlet 171 of the injector 144 is closed by the flared portion 174 of the armature 146.

The first end 162 of the first housing 142 is connected to the supply module 14 by passageway 34 and the outlet 171 of the injector 144 is connected to the exhaust mixer 22 by the passageway 35.

With the dosing module 24 in the configuration shown in FIG. 5, urea solution 20 cannot pass from the inlet 162 of the first housing 142 to the outlet 171 of the injector 144 and thus urea solution 20 is not supplied to the exhaust mixer 22.

Operation of the dosing module 124 is as described in connection with the first embodiment of the invention, with the exception that supply of electricity from the first electrical connector 152 to the dosing module 124 causes the solenoid coil 150 to be charged and the armature 146 to move towards the first end 162 of the first housing 142 against the bias of the spring 148. This results in the flared end 174 of the armature 146 moving away from the outlet 171 of the injector 144 and the dosing module to be in the open position (as shown in FIG. 3 in relation to the first embodiment of the invention).

In the event that the dosing module 124 does not pass the dosing module diagnostic check 82, the detection of a blocked dosing module 86 causes the dosing module control unit 16 to trigger heat up mode 88. With the dosing module 124 in heat up mode 88, electricity from the second electrical connector 155 is supplied to the second solenoid coil (not shown) at a greater power than is used to operate the dosing module 124 under normal conditions, for example use of a current at least 400 milliamps. This causes the temperature of the dosing module 24 to be increased, for example to 100° C. The temperature is held for a period of time 90, for example 360 seconds.

As described in relation to the first embodiment of the invention, the dosing module 24 includes a cooling jacket 54. It will be understood that the dosing module 24 may include alternative means to cool the dosing module, for example cooling fins.

As shown in FIG. 5, the dosing module 124 does not include a cooling jacket. It will be understood that the dosing module 124 may include a cooling jacket, for example as shown in FIGS. 2 and 3, or cooling fins.

As described in relation to the second embodiment of the invention, the first electrical connector supplies electricity to the first solenoid coil for moving the armature and the second electrical connector supplies electricity to the second solenoid coil for heating the dosing module and melting urea crystals. It will be understood that either or both of the first and second electrical connectors may supply electricity to the first solenoid coil for moving the armature and/or either or both of the first or second electrical connectors may supply electricity to the second solenoid coil for heating the dosing module and melting urea crystals.

In the embodiments described above, the temperature of the dosing module 24, 124 is increased by supplying electricity at a greater power than is used to operate the dosing module under normal conditions. It will be understood that in alternative embodiments, the temperature of the dosing module may be increased by supplying electricity at the same power as is used to operate the dosing module under normal conditions, but for a longer period of time.

What is claimed is:

1. A method of operating a dosing module for an emissions abatement system, the dosing module including an armature, a coil for moving the armature and a valve body having an outlet, wherein in normal operation the armature is moveable between a first position, in which the outlet is closed by the armature, and a second position, in which the armature is spaced apart from the outlet, and wherein, in use, application of electricity to the coil at a first level of energy causes the armature to move from the first position to the second position, the method comprising:
    (a) determining that the dosing module is in a blocked condition;
    (b) increasing the temperature of the dosing module by applying electricity at a second level of energy that is greater than the first level of energy to the coil; and
    (c) heating the dosing module until the dosing module is in an unblocked condition, in which liquid can flow through the dosing module, the method further comprising at least one or more of:
    (d) operating the dosing module to pass liquid through the dosing module, and/or wherein the step of determining that the dosing module is in a blocked condition includes determining that flow of a liquid through the dosing module is prevented and/or wherein the step of determining that the dosing module is in a blocked condition includes:
    (i) determining a first pressure of a liquid to be supplied by the dosing module prior to actuation of the dosing module;
    (ii) determining a second pressure of a liquid to be supplied by the dosing module during actuation of the dosing module; and
    (iii) comparing the first pressure and the second pressure, for example wherein, in step (iii) the second pressure is greater than the first pressure.

2. A method of operating a dosing module according to claim 1, wherein the step of increasing the temperature of the dosing module by applying electricity to the dosing module includes increasing the temperature to at least 100° C., and further comprises at least one of: increasing the temperature of the dosing module by applying electricity to the dosing module and holding the increased temperature for less than 400 seconds by applying electricity to the dosing module by applying an electrical current to the dosing module of at least 400 milliamps.

3. A method of operating a dosing module according to claim 1, wherein the liquid includes a reductant including at least one of: wherein the liquid includes urea, wherein the liquid includes Diesel Exhaust Fluid, or wherein the liquid includes AdBlue.

4. A method of operating a dosing module according to claim 1, wherein, when the dosing module is in the blocked condition, flow of a liquid through the outlet is prevented by crystals of the liquid.

5. A method of operating a dosing module according to claim 2, wherein increasing the temperature of the dosing module by applying electricity to the dosing module includes holding the increased temperature for less than 200 seconds.

6. A method of operating a dosing module according to claim 2, wherein increasing the temperature of the dosing module by applying electricity to the dosing module includes applying an electrical current to the dosing module of at least 500 milliamps.

* * * * *